J. C. HENDERSON.
FACING ARTIFICIAL STONE.
APPLICATION FILED AUG. 27, 1908.

969,692.

Patented Sept. 6, 1910.

Witnesses
F. A. Holmes
S. Constine

Inventor.
John C. Henderson
by Wm. F. Booth
his Attorney

UNITED STATES PATENT OFFICE.

JOHN C. HENDERSON, OF OAKLAND, CALIFORNIA, ASSIGNOR TO APOLLO ARTIFICIAL STONE COMPANY, OF SAN FRANCISCO, CALIFORNIA, A CORPORATION OF CALIFORNIA.

FACING ARTIFICIAL STONE.

969,692.   Specification of Letters Patent.   Patented Sept. 6, 1910.

Application filed August 27, 1908. Serial No. 450,561.

*To all whom it may concern:*

Be it known that I, JOHN C. HENDERSON, a citizen of Great Britain, residing at Oakland, in the county of Alameda and State of California, have invented certain new and useful Improvements in Facing Artificial Stone, of which the following is a specification.

My invention relates generally to the manufacture of artificial stone, and particularly to methods and processes of facing the same.

As generally known and practiced, the facing of artificial stone masses using Portland cement as a binder is conducted in one of three ways, namely:—First, by working the face of the mass with dilute acid until enough of the Portland cement is eaten away to leave the mineral aggregate exposed. Second, by working the face of the mass with tools, in imitation of stone work. Third, by plastering the face of the mass. In cases where it is desirable to face the mass with a layer which is denser and different in color than the body of the mass, there is also a process of introducing into a mold a semi-dry or semi-fluid layer, possibly colored to suit, and composed of a fine aggregate, and then tamping or pouring on this the body of the mass, the two being united before the initial set occurs in the facing. The faces of stones so produced are not as dense, nor as water proof, nor do they have as strong arris as natural building stones.

As distinguished from these methods, my invention consists essentially in pouring between the surface of a previously manufactured block of Portland cement concrete, and a mold which is spaced therefrom, a fluid aqueous mass of Portland cement, either neat or mixed with a fine aggregate, such as powdered marble dust, silica, sand, etc., and such coloring matter as may be desired.

The accompanying drawings illustrate my process.

Figure 1:
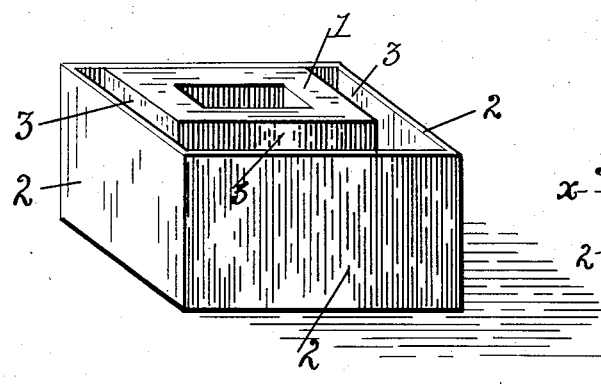
Figure 2:
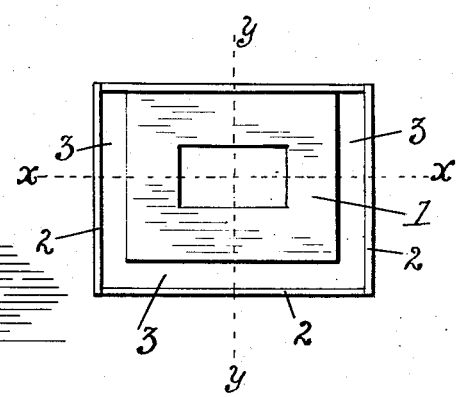
Figure 3:
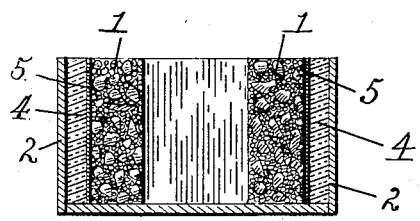
Figure 4:
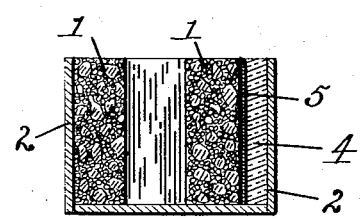

Figure 1 is a perspective view of a mold showing the previously manufactured concrete block in place, and adjusted relatively to the mold to have three of its sides faced. Fig. 2 is a plan of the same. Fig. 3 is a section on line *x—x* of Fig. 2, showing in addition the facing itself on two sides. Fig. 4 is a section on line *y—y* of Fig. 2, showing the facing of the remaining side.

In carrying out my process I take a previously manufactured block 1 of Portland cement concrete. The block 1 may be of any shape, solid or cored out, and may be formed in any suitable mold, in the ordinary way. Its dimensions are smaller than the finished faced product is to be, by just the thickness of the facing which is to be applied to it. It may be of any age past that of the final set. If comparatively new, so that it still contains a quantity of the original moisture, its surface to be faced needs no treatment such as I shall hereinafter mention, preparatory to receiving the facing mass. This previously manufactured block is now placed opposite to a mold-wall or walls 2 in such wise that its surface or surfaces intended to be faced are separated from said walls by a space of a thickness equal to the thickness that the facing is to be, which thickness added to that of the block represents the dimensions of the finished faced product. I now prepare a fluid aqueous mass of a cementitious material as follows. I take Portland cement, either neat, or with the addition of powdered marble dust, silica, sand, etc., and suitable coloring matter if required, and mix it with water to an extremely liquid condition, say of about the consistency of milk of lime, so that it is quite fluid. Before any set of this fluid mass occurs, I pour it into the space or spaces 3, shown in Figs. 1 and 2 between the previously manufactured concrete block and the mold-wall and fill said space with it, as shown at 4, in Figs. 3 and 4. Then finally, when the fluid mass is sufficiently set, I remove the mold wall. If the previously manufactured concrete block be old and dry, I prepare such surface as is to be faced, before placing it in the mold, by washing it with a mixture, of slightly thinner consistency, of the described facing material, as shown at 5, in Figs. 3 and 4. The mold surface, should, of course, be lubricated, to prevent sticking.

By this process I am enabled to face a previously manufactured block of Portland cement concrete, and I find that the fluid aqueous mass will flow into all molds, and ornamentations that may be in the mold face. By having the fluid aqueous mass of the proper consistency, the moisture in excess of that required for the set of the Portland cement is absorbed by the previously manufactured concrete block, thus leaving a dense and homogeneous face.

The previously manufactured block of concrete may be made cheap and inexpensive by using the proportion of aggregate to Portland cement which the use of the block may require, while the facing which I apply, may be made of more expensive cement and colored to suit the fancy.

It is possible for a manufacturer to carry in stock concrete blocks which have become strong through aging, so that quick delivery of a finished faced stone may be made.

The semi-dry block not only absorbs the excess of moisture from the fluid aqueous mass used for the facing, but also takes away the excess of alkali, thus removing the cause of checking and cracking on the face. A finished stone is thus produced, solid or hollow, low in cost as to the body of the stone, and high in strength as to the face and arris, and suitable for carving.

Having thus described my invention, what I claim as new and desire to secure by Letters Patent is:—

The improvement in facing artificial stone, which consists in manufacturing a set block of Portland cement concrete; then washing its surface to be faced with a fluid aqueous mixture of cementitious material; then spacing said washed surface from the surface of a mold; then pouring into the space between said block and mold a fluid aqueous mass of cementitious material; and, finally, after the set of said fluid aqueous mass removing the mold.

In testimony whereof I have signed my name to this specification in the presence of two subscribing witnesses.

JOHN C. HENDERSON.

Witnesses:
 WM. F. BOOTH,
 D. B. RICHARDS.